United States Patent
Mukherjee et al.

(10) Patent No.: US 12,041,036 B2
(45) Date of Patent: Jul. 16, 2024

(54) METHOD AND SYSTEM FOR PERFORMING IDENTITY CHECKS IN A DISTRIBUTED SYSTEM

(71) Applicant: BlackBerry Limited, Waterloo (CA)

(72) Inventors: Biswaroop Mukherjee, Stittsville (CA); Glenn Daniel Wurster, Kitchener (CA)

(73) Assignee: BlackBerry Limited, Waterloo (CA)

( * ) Notice: Subject to any disclaimer, the term of this patent is extended or adjusted under 35 U.S.C. 154(b) by 394 days.

(21) Appl. No.: 17/198,828

(22) Filed: Mar. 11, 2021

(65) Prior Publication Data

US 2022/0294770 A1 Sep. 15, 2022

(51) Int. Cl.
*H04L 9/40* (2022.01)
*G06F 9/54* (2006.01)
*H04L 9/30* (2006.01)
*H04L 67/56* (2022.01)

(52) U.S. Cl.
CPC .......... *H04L 63/0428* (2013.01); *G06F 9/547* (2013.01); *H04L 9/30* (2013.01); *H04L 63/0281* (2013.01); *H04L 63/08* (2013.01); *H04L 67/56* (2022.05)

(58) Field of Classification Search
CPC ....... H04L 63/0428; H04L 67/56; H04L 9/30; H04L 63/0281; H04L 63/08; G06F 9/547
See application file for complete search history.

(56) References Cited

U.S. PATENT DOCUMENTS

| | | | |
|---|---|---|---|
| 6,697,876 B1* | 2/2004 | van der Veen | G06F 9/546 719/313 |
| 2006/0085839 A1 | 4/2006 | Brandt et al. | |
| 2013/0318571 A1* | 11/2013 | Radzikowski | G06F 21/6218 726/4 |
| 2014/0045450 A1* | 2/2014 | Ballantyne | H04L 63/126 455/404.2 |
| 2016/0218939 A1* | 7/2016 | Tiwari | G06F 9/5072 |
| 2017/0290077 A1* | 10/2017 | Nilsson | H04W 12/04 |
| 2019/0207912 A1* | 7/2019 | Nielson | H04L 9/0877 |
| 2019/0333059 A1* | 10/2019 | Fallah | G06F 16/1834 |
| 2020/0259919 A1 | 8/2020 | Lepp et al. | |
| 2020/0320201 A1* | 10/2020 | Robinson | G06F 9/4416 |
| 2020/0366655 A1* | 11/2020 | Sun | H04L 67/104 |
| 2021/0006400 A1* | 1/2021 | Hu | G06F 21/64 |
| 2021/0021609 A1* | 1/2021 | Smith | H04L 45/72 |

(Continued)

FOREIGN PATENT DOCUMENTS

| | | |
|---|---|---|
| WO | 2020/165447 A2 | 8/2020 |
| WO | 2020/202135 A2 | 10/2020 |

OTHER PUBLICATIONS

International Search Report and Written Opinion, PCT Application No. PCT/CA2022/050362, mailed Jun. 24, 2022.

*Primary Examiner* — Harris C Wang
(74) *Attorney, Agent, or Firm* — Moffat & Co (57) ABSTRACT

A method at a remote proxy on a first node, the method including receiving, at the remote proxy, a first message from a first module on the first node, the first message being directed to a second module on a second node; verifying the first message at the remote proxy utilizing operating system verification; determining, based on a manifest at the remote proxy, the second node; signing, using a private key for the first node, the first message; and sending the first message to the second node.

19 Claims, 5 Drawing Sheets

(56) References Cited

U.S. PATENT DOCUMENTS

| | | | |
|---|---|---|---|
| 2021/0144517 A1* | 5/2021 | Guim Bernat | H04L 41/0869 |
| 2021/0294624 A1* | 9/2021 | Gray | G06F 8/654 |
| 2022/0263805 A1* | 8/2022 | Ray | H04L 69/162 |
| 2022/0294770 A1* | 9/2022 | Mukherjee | H04L 63/123 |

* cited by examiner

METHOD AND SYSTEM FOR PERFORMING IDENTITY CHECKS IN A DISTRIBUTED SYSTEM

FIELD OF THE DISCLOSURE

The present disclosure relates to distributed systems, and in particular relates to communications security in a distributed system.

BACKGROUND

Modern vehicles have many sensors. However, such sensors may be distributed within the various computing nodes on the vehicle, where each computing node may have access to zero, one or more sensor drivers. Such sensor nodes may further have different manufacturers, and operate using different operating systems. Similarly, other distributed systems could have a plurality of nodes where the nodes need to communicate with each other.

Determining an identity of interacting software entities is an important underpinning for the security of a software system. For example, a request for some data or action may or may not be granted, depending on the identity of the software module that made to the request. In modern, large, software systems, modules interact with each other by making requests as above. As such, it is vital to determine the identity of the requester in a secure, but efficient, manner.

BRIEF DESCRIPTION OF THE DRAWINGS

The present disclosure will be better understood with reference to the drawings, in which.

DETAILED DESCRIPTION OF THE DRAWINGS

The present disclosure provides a method at a remote proxy on a first node, the method comprising: receiving, at the remote proxy, a first message from a first module on the first node, the first message being directed to a second module on a second node; verifying the first message at the remote proxy utilizing operating system verification; determining, based on a manifest at the remote proxy, the second node; signing, using a private key for the first node, the first message; and sending the first message to the second node.

The present disclosure further provides a first computing node within a computer system, the first computing node comprising: a processor; and a communications subsystem, wherein the first computing node is configured to: receive, at a remote proxy on the first computing node, a first message from a first module on the first computing node, the first message being directed to a second module on a second computing node; verify the first message at the remote proxy utilizing operating system verification; determine, based on a manifest at the remote proxy, the second computing node; sign, using a private key for the first computing node, the first message; and send the first message to the second computing node.

The present disclosure further provides a computer readable medium for storing instruction code which, when executed by a processor of a first computing node within a computer system cause the first computing node to: receive, at a remote proxy on the first computing node, a first message from a first module on the first computing node, the first message being directed to a second module on a second computing node; verify the first message at the remote proxy utilizing operating system verification; determine, based on a manifest at the remote proxy, the second computing node; sign, using a private key for the first computing node, the first message; and send the first message to the second computing node.

It is important in a software system to determine the identity of the requester in a secure but efficient manner. Modern operating systems (OSs) have mechanisms to identify software components to enforce security policies. For example, most desktop operating systems have a way to identify the user on whose behalf the program is running, so that one user cannot tamper with another user's data or programs. In most UNIX systems, a User Identifier (UID) is used to identify users that own a file or process. Most operating systems take measures to protect the UID from tampering.

Such identity mechanism implementation in operating systems is efficient and has withstood attacks for decades. As such, it makes sense for a software system built on top of such operating system to use operating system supported identifiers to identify components. For example, in the Android™ operating system, the platform uses UIDs for each installed component for identifying such component.

However, in some distributed systems, a plurality of nodes may exist that run different operating systems. Software modules may be deployed across OSs, but may still need to interact and make requests of each other. In this regard, in accordance with the present disclosure, methods and systems are provided to allow for secure but efficient communications between modules on different computing nodes running different operating systems.

Example Distributed System

The present disclosure will be described with regard to an automotive system with distributed nodes. However, this is merely provided for illustration purposes and the methods and systems described herein could equally be used with any other distributed systems.

Figure 1:
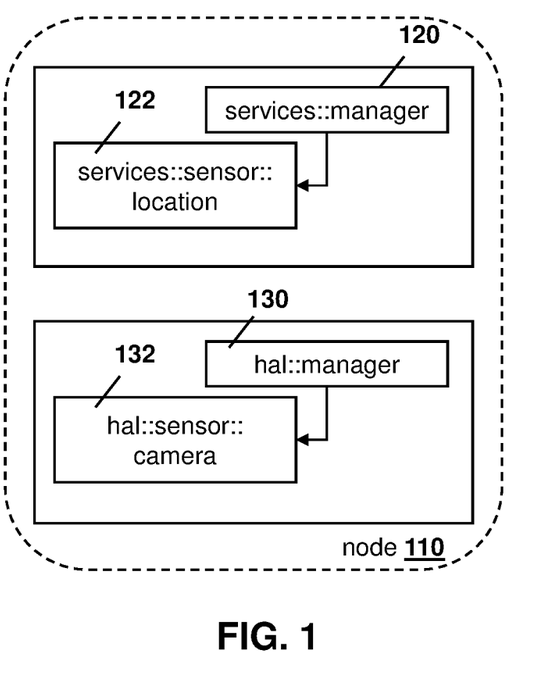
FIG. 1 is a block diagram showing an example computing node within a computer system.

For example, reference is now made to FIG. 1 which shows a node 110. A node, as used herein, may be one or a group of electronic control units, central processing units, or kernel controls, among other options, and can be considered as a single computing unit.

In the example of FIG. 1, node 110 includes a services manager 120 which may interact with drivers for sensors that the node is connected to. For example, the node 110 may have access to a location sensor such as a Global Positioning System (GPS) chipset, as shown at block 122.

In order to allow node 110 to interact with modules on other nodes, and to provide functionality with a computing system, a Hardware Abstraction Layer (HAL) may be provided on node 110, which comprises a HAL service 130. Each HAL service 130 is responsible for the integration of a sensor and may provide various functions, including:

integration to the underlying sensor; normalization of the sensor data; and/or, if required, providing a barrier between the safety certified and non-certified software. Other functions for the HAL service are also possible.

In the example of FIG. 1, the HAL is provided for camera information, as shown with block 132.

While the example of FIG. 1 shows a node 110 with a single service and a single HAL, this is merely provided for illustration purposes. A node 110 could have a single service without a HAL, a single HAL without a service, a plurality of services with no HAL, a plurality of HALs with no service, and/or a combination of services and HALs.

One example of a system that could use node 110 would be an applications development environment for vehicles. Such applications development environment may develop applications for user experience including comfort, navigation, infotainment, among others, applications for safety, applications for fleet management; applications for performance monitoring; or other such applications for a vehicle environment. In particular, vehicles provide a plurality of sensors and different makes, models or brands may use different sensors with different data formats or values, creating fragmented sensor readings depending on such sensor. This fragmentation impedes the fostering of an application ecosystem that makes use of vehicle data. In addition, low level sensor data is often too granular to be readily useful to applications.

In this regard, the Hardware Abstraction Layer can be used to provide hardware independent sensor interfaces/abstractions which may encapsulate interaction with underlying sensor drivers. The use of the hardware abstraction in the various computing nodes creates a platform that is extensible, can provide barriers between modules to, for example, enforce safety certified systems being separate from other systems, among other options.

Applications do not interact directly with sensor hardware to access sensor data, instead they leverage the Hardware Abstraction Layer. This separation provides a clear distinction between the responsibilities of the HAL (sensor integration and normalizing sensor data) and other abstractions such as a Vehicle Abstraction Layer (VAL), used for managing access to vehicle data and providing value-added insights.

Specifically, insights may leverage sensor data from multiple HALs in order to provide vehicle abstraction and value-added insights. Vehicle insight services in the VAL may control access to a normalized form of vehicle data and provide value-added inferences. Examples of insight services may include a Location Service, which may provide coordinate location data in a consistent format as well as insights such as geo-fencing; a Seat Service, which may provide a myriad of seat information such as belt status, weight, position, and child lock status; a Camera Service which may provide the video stream for in-cabin camera and possibly functions such as conversions and/or clipping; a Battery Service which may provide insights and access to battery such as charge state/consumption/projected hours remaining/projected range; a Door Service which may provide an abstraction for vehicle doors and door status; among others.

Insight Services may leverage sensor data from multiple HALs in order to provide vehicle abstraction and value-add insights. Higher level insights on data enable application developers to create future automotive experiences. Insight is the term used to describe any value-added interpretation of basic sensor data. Insights can be as straight forward as data aggregation or correlation or as complex as artificial intelligence and machine learning. For example, for a temperature sensor, providing high and low watermarks for notification may be considered an "insight". For location services—geofencing is an insight, for cameras—occupant recognition may be considered an insight.

Nodes with services and HAL managers as described in FIG. 1 are therefore needed for such application development environment. However, node 110 will, in may systems, need to communicate with other nodes, such as other ECUs, CPUs, or computing systems, where such ECUs, CPUs, or computing systems may use a different operating system from that of node 110. It is however important for security that the processes, applications and modules on node 110 recognize the requester to avoid tampering with data and processes, and ensure access to processes and data is only done in an authorized manner.

Remote Proxy Model

In accordance with the embodiments of the present disclosure, security within a node is provided utilizing existing OS mechanisms, including UIDs and group identifiers (GIDs). Such mechanisms are well known and easy to use. The present disclosure overlays such mechanisms with a remote proxy to bridge a security gap across operating system installations of different nodes.

Figure 2:
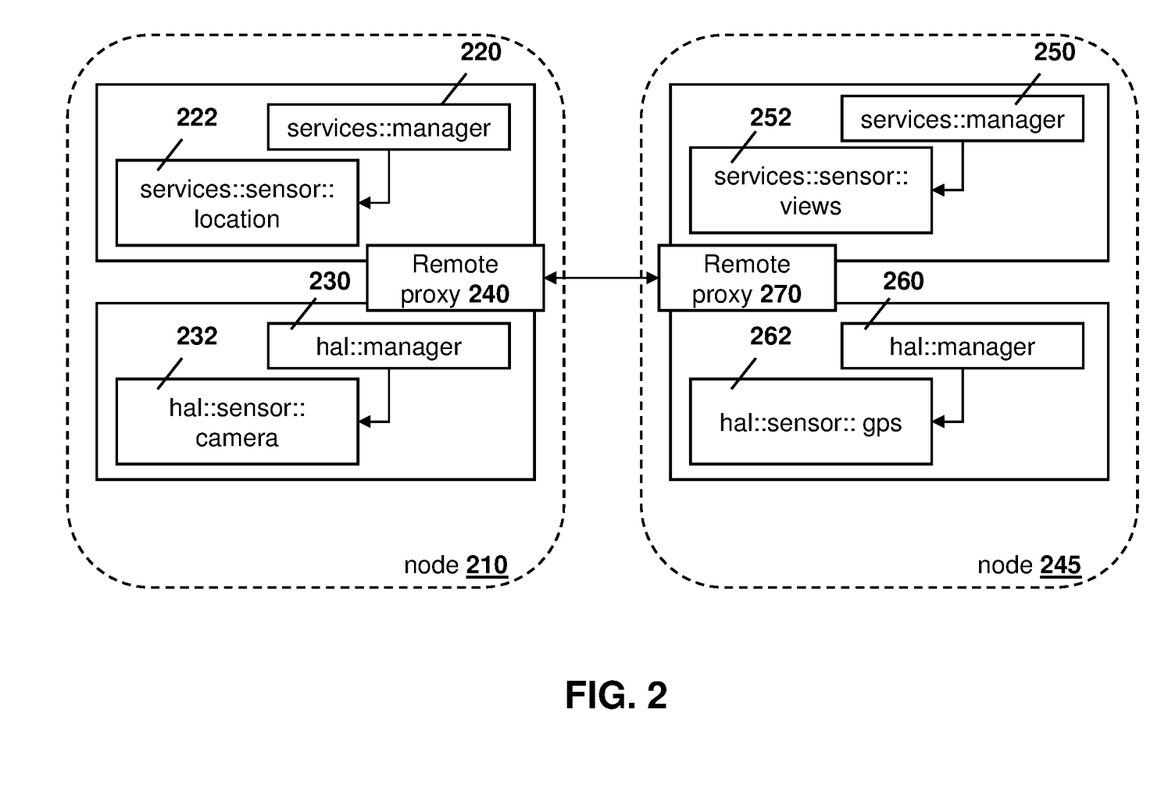
FIG. 2 is a block diagram showing two computer nodes which each use a remote proxy to present blocks on other nodes as local to modules within their respective nodes.

Reference is now made to FIG. 2. In the embodiment of FIG. 2, a node 210 provides a service having a services manager 220 and a sensor, namely a location sensor, shown at block 222.

Further, node 210 includes a HAL with a HAL manager 230 and sensor information for a camera, as shown at block 232.

There is a single network entry point for service requests into node 210, namely remote proxy 240. Remote proxy 240 is the representative of node 210 for the remainder of the computing system, and provides a representation of the remaining computing system to modules within node 210. Remote proxy 240 is trusted by credentials that are deployed on it and that uniquely identify the node.

Similarly, node 245 includes services with a services manager 250. In the example of FIG. 2, the services include a camera sensor, shown at block 252.

Further, in the example of FIG. 2, node 245 includes a HAL with a HAL manager 260. In this case, the HAL represents the GPS, as shown by block 262.

Node 245 further includes a remote proxy 270 which represents node 245 throughout the remainder of the computing system, and vice versa.

Remote proxy 240 is the only module that can sign packets on behalf of the node that will be accepted remotely. In this regard, trusted nodes that are on a computing system are provisioned with a public key or certificate of peers that they are expected to communicate with.

In another aspect, trusted nodes are also provisioned to host a specific set of services locally. These properties of a node are captured in a remote node manifest and are used by remote proxies 240 and 270 to know where to direct service requests. For example, remote proxy 240 may be provisioned with the manifest in Table 1 below, reflecting that node 210 may communicate with node 245 and that node 245 provides certain types of services and HALs that can be accessed from a remote node.

TABLE 1

Remote Manifest for Another
Node in a Computing System

```
node1 manifest {
  pubkey= 18dhksddhqssbn;
  services = views;
  hals = gps;
}
```

As seen in Table 1 above, node 210, and specifically remote proxy 240, is permitted to communicate with node 245 and can expect to receive camera views as services from node 245, as well as GPS HALs from node 245. Node 210 is provided with the public key of node 245 to validate the origin of messages. In the example of Table 1, the pubkey filed in Table 1 may be representative of a specification, such as the Internet Engineering Task Force (IETF) Request For Comments (RFC) 7517, that may be used in a particular embodiment.

Similarly, remote proxy 270 may be provisioned or store a manifest for node 210 if it is expected to communicate with node 210. Such a manifest is, for example, shown with regard to Table 2 below.

TABLE 2

Remote Manifest for Another
Node in a Computing System

```
node0 manifest {
  pubkey= dsdfw324r35t23213;
  services = location;
  hals = camera;
}
```

In this case, node 245, and specifically remote proxy 270, is permitted to communicate with node 210 and can expect to receive locations as services from node 210, as well as a camera HAL from node 210. Node 245 is provided with the public key of node 210 to validate the origin of messages.

Figure 3:
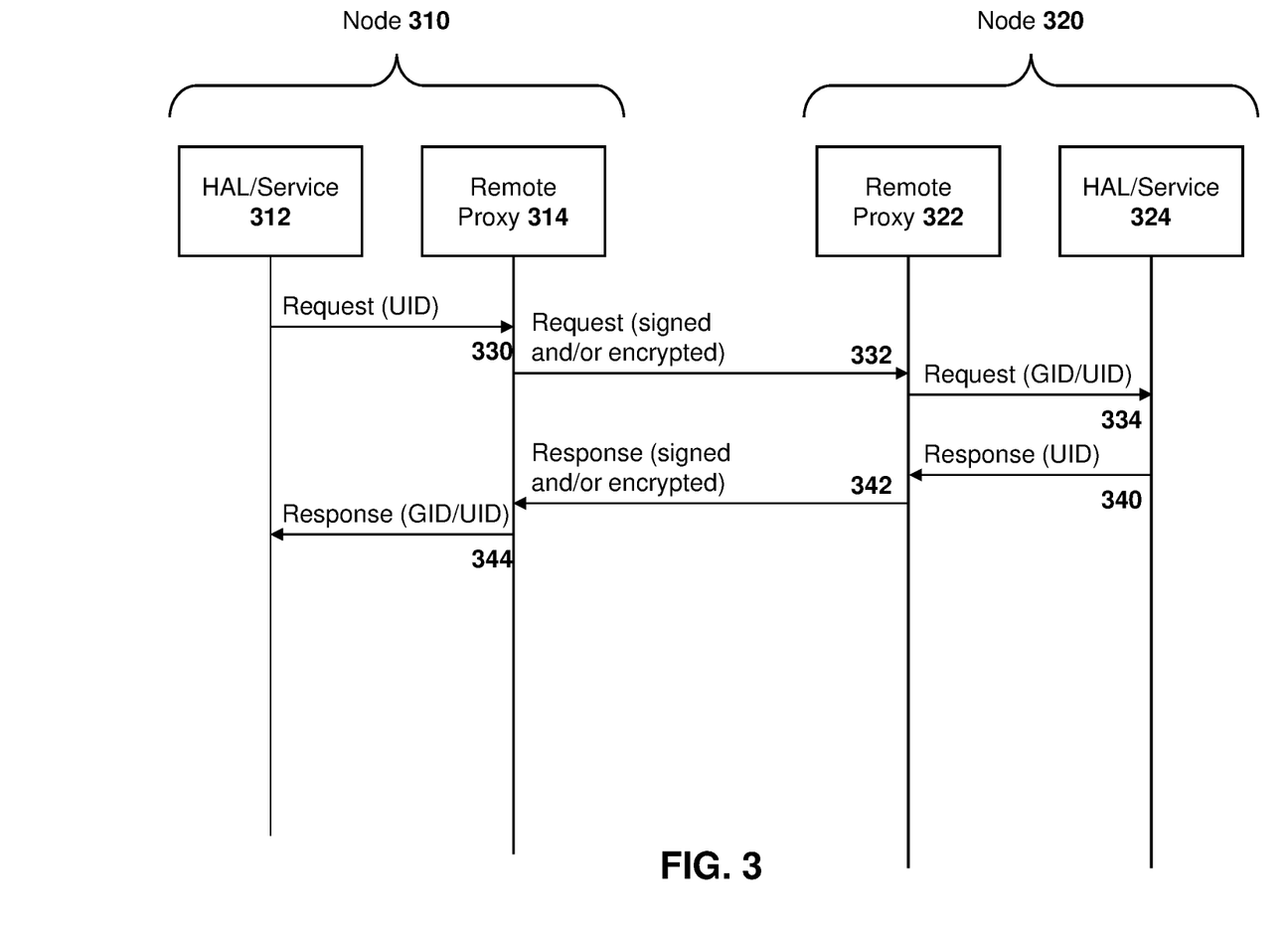
FIG. 3 is a dataflow diagram showing messages being sent between one module and a second module.

Requests from a service or HAL in a first node for a service or HAL that is on another node is routed via the trusted remote proxy. Reference is now made to FIG. 3.

In the embodiment of FIG. 3, a node 310 includes at least one HAL or service 312 as well as a remote proxy 314.

Similarly, a node 320 includes a remote proxy 322 and at least one HAL or service 324.

Requests from a service in a node 310 for a HAL that is on another node are routed via the remote proxy. The interface of the proxy available to the local services is the service proxy representing the services that are available for use across the system.

In particular, as illustrated in FIG. 2, a remote proxy exists on a node in addition to the service and HAL manager. Local registrations therefore do not leave the node. The group ID and permissions assigned to the remote proxy is the union of the services the remote proxy connects to.

In particular, a HAL or service 312 has a request for a HAL or service 324. The HAL or service 312 treats remote proxy 314 as the destination for such request and therefore sends a request with its user identifier to remote proxy 314, shown with message 330.

The remote proxy 314 does a lookup for the HAL or service being requested in message 330 utilizing the manifests within the remote proxy 314. In this case, the manifest lookup finds that the service or HAL with the required information is on node 320. Remote proxy 314 can then make a request to remote proxy 322, shown with message 332. Message 332 is in some cases encrypted with the public key of remote proxy 322, as found in the manifest. In other cases, the request may be signed and remote proxy 322 may use the public key for node 310 found in a manifest for node 310 in order to verify the signature.

Once remote proxy 322 receives message 332 and decrypts and/or verifies the message, it can check whether the message is meant to be received by node 320 based on a manifest for node 310. If node 320 can validly receive the request in message 332, the remote proxy 322 can then send the request to the HAL or service 324 utilizing operating system verification methods, such as a GID or a UID for remote proxy 322.

The HAL or service 324 recognizes the local request and thus provides a response in message 340. Message 340 is sent as if it was a local message on the operating system with the UID of the HAL or service 324.

Remote proxy 322 receives and recognizes the response in message 340. It may thereafter encrypt the response utilizing the public key found in a manifest for node 310. Alternatively, or in addition, node 320, and in particular remote proxy 322, may sign the message utilizing its private key. The response can then be sent as message 342 back to remote proxy 314.

Remote proxy 314 receives message 342 and may decrypt and/or verify the message. Thereafter, remote proxy 314 can send the response to the HAL or service 312, shown with message 344.

Message 344 is treated as a local message and may contain the GID or UID of the remote proxy 314. It is therefore verified at the HAL or service 312 utilizing standard operating system procedures.

Based on the above, when a lookup for a remote service is made, the manager therefore sends the request to the remote proxy. The deployment fixes the manifests and distributes it to other nodes. The abstraction for all services and HALs is such that all transactions appear local in terms of the Application Program Interface (API).

Further, from the embodiment of FIG. 3, the remote proxy has its own UID. This UID is assigned to the permissions granted to the remote services that the remote proxy represents. When a permission check is done on a request received from a remote proxy, the relevant permissions grant is checked by a permissions manager. The remote proxy itself implements a table of remote services and the requests that they can make based on the manifest.

Referring to the embodiment of FIG. 2, if the remote proxy of node 210 receives a message from node 245 purporting to be from a camera HAL, the message will be rejected since the manifest for node 245 does not list a camera HAL, as for example shown in Table 1.

Similarly, a request from a local module within a node is checked to be originating from the purported a UID listed in the node configuration by the remote proxy before the message or request is forwarded to a remote module.

In this way, all messages can be treated as local messages from the point of view of any HAL or service, and therefore verification of the identity of the requesting party can be done in a secure and efficient manner.

In an alternative embodiment, rather than a single remote proxy for a node within a system, each service or HAL may contain or include a remote proxy. In other cases, subsets or groups of services or HALs may utilize a single proxy while other subsets or groups use a different proxy.

Figure 4:
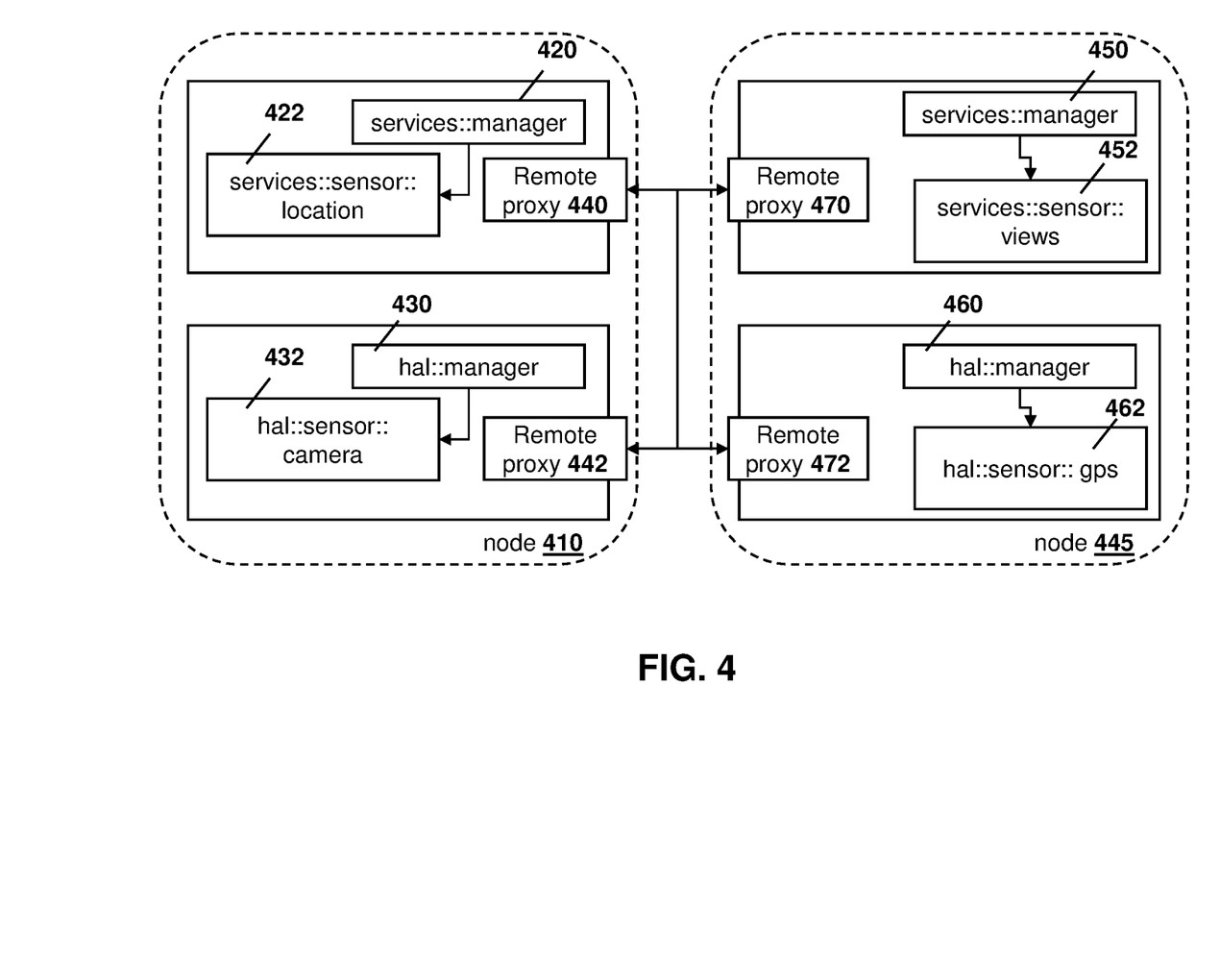
FIG. 4 is a block diagram showing two computer nodes which use remote proxies on each module within the node to present blocks on other nodes as local such module.

Reference is now made to FIG. 4. In the example of FIG. 4, a node 410 includes a service with a services manager 420. In this case, the service is a location service as shown by block 422.

Further, node 410 includes an HAL with a HAL manager 430. In the example of FIG. 4, the HAL is for a camera, as shown at block 432.

The services include a remote proxy 440, while the HAL includes a remote proxy 442.

Similarly, a node 445 includes services which have a services manager 450 and in the case of FIG. 4, the services are provided for a camera as shown at block 452.

Node 445 further includes an HAL with a HAL manager 460. In the example of FIG. 4, the HAL is for a location or GPS sensor as shown at block 462.

The services include a remote proxy 470 and the HAL includes a remote proxy 472.

In the example of FIG. 4, a remote proxy 440 may receive manifests for both remote proxy 470 as well as remote proxy 472. In this case, remote proxy 440 may utilize the information in the manifest to direct the request to a particular proxy on node 445. Local requests between the HAL with a HAL manager 430 and the services with services manager 420 would still utilize local operating system verification techniques as described above.

Communications between components of node 410 and a remote proxy such as remote proxy 440 or 470 would utilize operating system techniques. Communications between remote proxies on different nodes could be encrypted and/or signed. Therefore, the process of FIG. 3 would apply to the embodiment of FIG. 4.

Based on the above, services or hardware abstraction layers on remote nodes utilizing different operating systems may be treated as local services or hardware abstraction layers, with a remote proxy acting as a local module and representing such services or hardware abstraction layers from other nodes. The application program interface and communications are therefore done in a secure manner utilizing operating system techniques and appear to be local to the various modules within the nodes.

Remote proxies are provisioned or configured with manifests indicating the types of services or abstraction layers provided by other nodes within the computing system, as well as keys for communication with these other nodes to allow for communications to be done in a secure manner.

The above ECUs, nodes, and other computing platforms may be implemented using any computing device. One simplified diagram of a computing device is shown with regard to FIG. 5. The computing device of FIG. 5 could be any fixed or mobile computing device.

Figure 5:
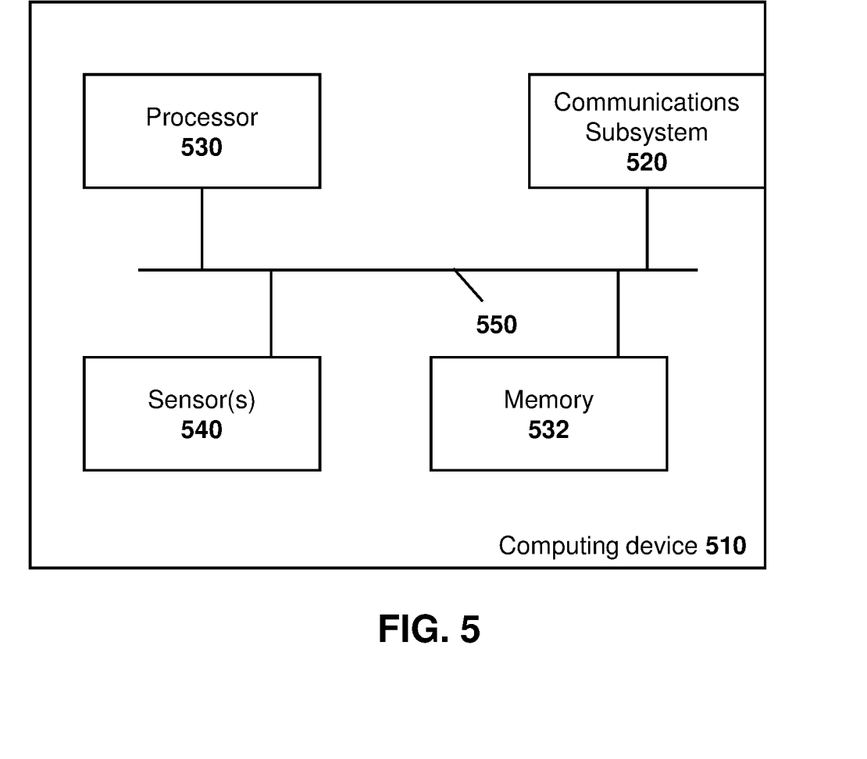
FIG. 5 is a block diagram of a simplified computing device capable of being used with the embodiments of the present disclosure.

In FIG. 5, device 510 includes a processor 520 and a communications subsystem 530, where the processor 520 and communications subsystem 530 cooperate to perform the methods of the embodiments described above. Communications subsystem 530 allows device 510 to communicate with other devices or network elements and may vary based on the type of communication being performed. Further, communications subsystem 530 may comprise a plurality of communications technologies, including any wired or wireless communications technology.

Processor 520 is configured to execute programmable logic, which may be stored, along with data, on device 510, and shown in the example of FIG. 5 as memory 532. Memory 532 can be any tangible, non-transitory computer readable storage medium which stores instruction code that, when executed by processor 520 cause device 510 to perform the methods of the present disclosure. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 532, device 510 may access data or programmable logic from an external storage medium, for example through communications subsystem 530.

In the example of FIG. 5, one or more sensors 540 may be associated with the computing device. However, this is optional and in some cases computing device 510 will not be associated with sensors.

Communications between the various elements of device 510 may be through an internal bus 560 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be employed. Moreover, the separation of various system components in the implementation descried above should not be understood as requiring such separation in all implementations, and it should be understood that the described program components and systems can generally be integrated together in a single software product or packaged into multiple software products.

Also, techniques, systems, subsystems, and methods described and illustrated in the various implementations as discrete or separate may be combined or integrated with other systems, modules, techniques, or methods. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made.

While the above detailed description has shown, described, and pointed out the fundamental novel features of the disclosure as applied to various implementations, it will be understood that various omissions, substitutions, and changes in the form and details of the system illustrated may be made by those skilled in the art. In addition, the order of method steps are not implied by the order they appear in the claims.

When messages are sent to/from an electronic device, such operations may not be immediate or from the server directly. They may be synchronously or asynchronously delivered, from a server or other computing system infrastructure supporting the devices/methods/systems described herein. The foregoing steps may include, in whole or in part, synchronous/asynchronous communications to/from the device/infrastructure. Moreover, communication from the electronic device may be to one or more endpoints on a network. These endpoints may be serviced by a server, a distributed computing system, a stream processor, etc. Content Delivery Networks (CDNs) may also provide may provide communication to an electronic device. For example, rather than a typical server response, the server may also provision or indicate a data for content delivery network (CDN) to await download by the electronic device at a later time, such as a subsequent activity of electronic device. Thus, data may be sent directly from the server, or other infrastructure, such as a distributed infrastructure, or a CDN, as part of or separate from the system.

Typically, storage mediums can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly a plurality of nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

The invention claimed is:

1. A method at a remote proxy on a first node, the method comprising:
   receiving, at the remote proxy, a first message from a first module on the first node, the first message comprising a request for a service, the request identifying the service;
   verifying the first message at the remote proxy utilizing operating system verification;
   determining, based on a manifest at the remote proxy, a second computing node which provides the service;
   signing, using a private key for the first node, the first message; and
   sending the first message to the second node;
wherein the remote proxy stores manifests for nodes within a computing system that may communicate with the first node.

2. The method of claim 1, further comprising:
   receiving a second message at the remote proxy, the second message being directed to the first module on the first node and being signed using a private key of the first module;
   verifying the second message using a public key for the second node found in the manifest; and
   forwarding the second message to the first module as a local message using operating system verification for the remote proxy.

3. The method of claim 2, wherein the verifying further comprises checking a source module for the second message against the manifest for the second node to ensure the source module is part of the second node.

4. The method of claim 1, wherein the operating system verification comprises a user identifier or a group identifier for a process or data.

5. The method of claim 1, where the first message appears local in terms of an Application Program Interface at the remote proxy.

6. The method of claim 1, wherein the first node and the second node use different operating systems.

7. The method of claim 1, wherein the first message is further encrypted by the remote proxy using a public key for the second node found in the manifest prior to the sending of the first message.

8. The method of claim 1, wherein the first node is a computing unit in a computer system, and wherein the first module is one of a hardware abstraction layer or a service for a sensor in the computer system.

9. The method of claim 8, wherein the first node includes a plurality of hardware abstraction layers, a plurality of services, or a combination of at least one hardware abstraction layer and at least one service; and
   wherein a plurality of remote proxies exist on the first node, each of the plurality of remote proxies being associated with a subset of hardware abstraction layers and/or services.

10. A first computing node within a computer system, the first computing node comprising:
    a processor; and
    a communications subsystem, wherein the first computing node is configured to:
       receive, at a remote proxy on the first computing node, a first message from a first module on the first computing node, the first message comprising a request for a service, the request identifying the service;
       verify the first message at the remote proxy utilizing operating system verification;
       determine, based on a manifest at the remote proxy, a second computing node which provides the service;
       sign, using a private key for the first computing node, the first message; and
       send the first message to the second computing node;
    wherein the remote proxy stores manifests for nodes within a computing system that may communicate with the first node.

11. The first computing node of claim 10, wherein the first computing node is further configured to:
    receive a second message at the remote proxy, the second message being directed to the first module on the first computing node and being signed using a private key of the first module;
    verify the second message using a public key for the second computing node found in the manifest; and
    forward the second message to the first module as a local message using operating system verification for the remote proxy.

12. The first computing node of claim 11, wherein the first computing node is configured to verify by checking a source module for the second message against the manifest for the second computing node to ensure the source module is part of the second computing node.

13. The first computing node of claim 10, wherein the operating system verification comprises a user identifier or a group identifier for a process or data.

14. The first computing node of claim 10, where the first message appears local in terms of an Application Program Interface at the remote proxy.

15. The first computing node of claim 10, wherein the first computing node and the second computing node use different operating systems.

16. The first computing node of claim 10, wherein the first message is further encrypted by the remote proxy using a public key for the second computing node found in the manifest prior to the sending of the first message.

17. The first computing node of claim 10, wherein the first module is one of a hardware abstraction layer or a service for a sensor in the computer system.

18. The first computing node of claim 17, wherein the first computing node includes a plurality of hardware abstraction layers, a plurality of services, or a combination of at least one hardware abstraction layer and at least one service; and wherein a plurality of remote proxies exist on the first computing node, each of the plurality of remote proxies being associated with a subset of hardware abstraction layers and/or services.

19. A non-transitory computer readable medium for storing instruction code which, when executed by a processor of a first computing node within a computer system cause the first computing node to:
   receive, at a remote proxy on the first computing node, a first message from a first module on the first computing node, the first message comprising a request for a service, the request identifying the service;
   verify the first message at the remote proxy utilizing operating system verification;
   determine, based on a manifest at the remote proxy, a second computing node which provides the service;
   sign, using a private key for the first computing node, the first message; and
   send the first message to the second computing node;
wherein the remote proxy stores manifests for nodes within a computing system that may communicate with the first node.

* * * * *

UNITED STATES PATENT AND TRADEMARK OFFICE
CERTIFICATE OF CORRECTION

PATENT NO. : 12,041,036 B2
APPLICATION NO. : 17/198828
DATED : July 16, 2024
INVENTOR(S) : Biswaroop Mukherjee and Glenn Daniel Wurster It is certified that error appears in the above-identified patent and that said Letters Patent is hereby corrected as shown below:

In the Claims

Column 9, Line 57, in Claim 1 please delete "second node" and insert -- second computing node --, therefor.

Column 9, Line 67, in Claim 2 please delete "second node" and insert -- second computing node --, therefor.

Column 10, Lines 6 to 7, in Claim 3 please delete "second node" and insert -- second computing node --, therefor (please note that "second node" appears twice in Lines 6 to 7 and both should be corrected).

Column 10, Line 15, in Claim 6 please delete "second node" and insert -- second computing node --, therefor.

Column 10, Line 18, in Claim 7 please delete "second node" and insert -- second computing node --, therefor.

Column 10, Line 50, in Claim 10 please delete "a computing system" and insert -- the computer system --, therefor.

Column 10, Line 51, in Claim 10 please delete "first node" and insert -- first computing node --, therefor.

Column 12, Line 20, in Claim 19 please delete "a computing system" and insert -- the computer system --, therefor.

Signed and Sealed this
Tenth Day of February, 2026

John A. Squires
*Director of the United States Patent and Trademark Office*

Column 12, Lines 20 to 21, in Claim 19 please delete "first node" and insert -- first computing node --, therefor.